United States Patent [19]

Wolff et al.

[11] Patent Number: 5,369,207
[45] Date of Patent: Nov. 29, 1994

[54] PREPARATION OF LOW-VISCOSITY, ISOCYANURATE AND URETHANE GROUP-CONTAINING POLYISOCYANATE MIXTURES

[75] Inventors: Stefan Wolff, Limburgerhof; Hans Renz, Meckenheim; Guenter Mohrhardt, Speyer, all of Germany

[73] Assignee: BASF Aktiengesellschaft, Ludwigshafen, Germany

[21] Appl. No.: 90,419

[22] Filed: Jul. 12, 1993

[30] Foreign Application Priority Data

Sep. 2, 1992 [DE] Germany .................. 4229183

[51] Int. Cl.⁵ .................. C08G 18/80; C08G 18/30
[52] U.S. Cl. .................. 528/49; 528/52; 528/73; 544/193
[58] Field of Search .................. 528/49, 52, 73; 544/193

[56] References Cited

U.S. PATENT DOCUMENTS

| | | | |
|---|---|---|---|
| 4,359,541 | 11/1982 | Patton, Jr. et al. | 521/137 |
| 4,537,961 | 8/1985 | Robin | 544/193 |
| 4,614,785 | 9/1986 | Richter et al. | 528/45 |
| 5,144,031 | 9/1992 | Pedain | 528/49 |

*Primary Examiner*—Maurice J. Welsh
*Attorney, Agent, or Firm*—Dennis V. Carmen

[57] ABSTRACT

A process for the preparation of isocyanurate and urethane group-containing and, if desired, uretdiode and allophanate group-containing polyisocyanate mixtures by partially cyclizing organic, preferably (cyclo)aliphatic diisocyanates, in the presence of trimerization catalysts, deactivating these catalysts, reacting the partially trimerized, isocyanurate and, if desired, uretdiode group-containing polyisocyanate mixture with 0.5 to 10 mol % of at least one aliphatic or cycloaliphatic alcohol and/or polyoxyalkylene alcohol, and separating off the monomeric diisocyanates.

20 Claims, No Drawings

PREPARATION OF LOW-VISCOSITY, ISOCYANURATE AND URETHANE GROUP-CONTAINING POLYISOCYANATE MIXTURES

The present invention relates to a process for the preparation of isocyanurate and urethane group-containing and, if desired, uretdione and allophanate group-containing polyisocyanate mixtures of low viscosity by partially cyclizing preferably aliphatic, cycloaliphatic or araliphatic diisocyanates in the presence of trimerization catalysts, deactivating these catalysts, reacting the partially trimerized isocyanurate and, if desired, uretdione group-containing polyisocyanate mixtures with from 0.5 to 10 mol % of at least one aliphatic or cycloaliphatic alcohol or at least one polyoxyalkylene alcohol or a mixture of at least two of these alcohols, and separating off the monomeric diisocyanates.

For the preparation of high-quality one- or two-component polyurethane (PU) adhesives and high-quality, light-stable, weathering-resistant one- or two-component PU surface coating materials, the polyisocyanate component used is, in particular, isocyanurate group-containing polyisocyanate mixtures.

These products are obtained by cyclizing preferably aliphatic and/or cycloaliphatic diisocyanates, e.g. 1,6-hexamethylene diisocyanate (HDI) or 1-isocyanato-3,5,5-trimethyl-3-isocyanatomethylcyclohexane (IPDI), in the presence of trimerization catalysts.

Examples of suitable trimerization catalysts are tertiary amines, phosphines, alkoxides, metal oxides, hydroxides, carboxylates and organometallic compounds. Examples of trimerization catalysts which have proven highly successful are tris-(N,N-dialkylaminoalkyl)-s-hexahydrotriazines and organic salts of weak acids containing tetraalkylammonium groups or hydroxyalkylammonium groups, for example tris-(N,N-dimethylaminopropyl)-s-hexahydrotriazine, trimethyl-N-2-hydroxypropylammonium 2-ethylhexanoate and N,N-dimethyl-N-hydroxyethyl-N-2-hydroxypropylammonium hexanoate.

For the preparation of the isocyanurate group-containing polyisocyanates, the organic diisocyanates are cyclized in the presence of the trimerization catalyst and, if desired, in the presence of solvents and/or assistants, expediently at elevated temperature, until the desired NCO content has been reached. The reaction is then terminated by deactivating the catalyst, and the excess monomeric diisocyanate is separated off, preferably by distillation with the aid of a thin-film evaporator. Depending on the type and amount of catalyst used and on the reaction conditions used, isocyanurate group-containing polyisocyanate mixtures are obtained which can have different contents of uretdione groups or oligomeric isocyanurates.

The isocyanurate group-containing polyisocyanate mixtures prepared in this way can be reacted with polyhydroxyl compounds, for example polyhydroxyacrylates, by known methods to give 1- or 2-component PU paints. The curing of these paints is carried out by drying in air and can be accelerated thermally and/or catalytically.

Although the isocyanurate group-containing polyisocyanate mixtures have a longer shelf life and better weathering resistance than biuret group-modified polyisocyanate mixtures, they also have disadvantages. An example is their high viscosity, which means that they can only be processed in polar solvents, e.g. ethyl acetate, toluene or xylene, which are frequently toxic. A further disadvantage is their inadequate compatibility with fluorine-containing resins, as are usually used for weatherproofing.

In order to overcome the last-mentioned disadvantage, the isocyanurate group-containing polyisocyanate mixtures are modified according to U.S. Pat. No. 4,789,905 with alkanediols or cycloalkanediols having 10 to 40 carbon atoms or according to U.S. Pat. No. 5,086,175 with monoalcohols having 10 to 50 carbon atoms, employed in amounts of from 0.1 to 30% by weight and from 1 to 40% by weight respectively, based on the amount of diisocyanate, by the following two processes: the diisocyanate is reacted with the monoalcohol or diol in the presence of a trimerization catalyst, and the unreacted, monomeric diisocyanate is then separated off from the reaction mixture, or the diisocyanate is partially cyclized in the presence of the trimerization catalyst. The unreacted, monomeric diisocyanates are separated off from the resultant reaction mixture, and the isocyanurate group-containing polyisocyanate mixture is reacted with the monoalcohols or diols.

Also known are processes for the preparation of isocyanurate group-containing polyisocyanate mixtures in which the trimerization catalysts are employed in combination with an accelerator, e.g. a phenolic or alcoholic hydroxyl compound or a tertiary amine. According to DE-A-32 19 608 (U.S. Pat. No. 4,604,418), HDI is trimerized using, in addition to the sodium or potassium salt of an organic carboxylic acid having 3 to 11 carbon atoms as trimerization catalyst, also an accelerator in an amount of from 0.01 to 0.2% by weight, based on the amount of HDI employed. Specific examples of suitable accelerators mentioned are phenolic hydroxyl compounds, e.g. phenol, cresol and trimethylphenol, and alcoholic hydroxyl compounds, e.g. ethanol, cyclohexanol and ethylene glycol, and tertiary amines, such as triethylamine, methylpyridine and benzyldimethylamine.

EP-A 0 155 559 describes the use of trialkyl-N-2-hydroxypropylammonium benzoate derivatives as trimerization catalysts for the preparation of isocyanurate group-containing polyisocyanates. These catalysts too can be employed in combination with monohydric or polyhydric alcohols in amounts up to a maximum of 6 mol % or phenols in amounts up to a maximum of 5 mol % as accelerators. It is disadvantageous in these processes, in which the trimerization of the diisocyanate is carried out in the presence of the alcoholic or phenolic hydroxyl compounds, that the urethanes formed from the diisocyanate and the hydroxyl compound react further to an increased extent to give allophanates, which can considerably impair the shelf life of the isocyanate, urethane and allophanate group-containing polyisocyanate mixtures. Due to the tendency of allophanates to re-cleave during storage to give the diisocyanates employed, they are of only limited suitability as, for example, raw materials for paints.

Isocyanurate polyisocyanates having a high proportion of isocyanurate groups and extremely low viscosity are described in DE-A-38 10 908 (U.S. Pat. No. 4,801,663). The isocyanurate polyisocyanates described contain, based on the total weight, at least 60% by weight of N,N',N''-tris(6-isocyanatohexyl)isocyanurate, up to 10% by weight of N,N'-bis(6-isocyanatohexyl- )uretdione and up to 40% by weight of poly(6-isocyanatohexyl) isocyanurate.

As a consequence of the trend toward solvent-free or at least low-solvent paint systems, there is a demand, even in heavy-duty light-stable and weathering-resistant PU paints, for the development of high-solids PU paint systems which are distinguished compared with conventional systems by low viscosity, i.e. equally good processing properties for a reduced solvent content. The particular disadvantage of high-solids PU paint raw materials are their unsatisfactory handling properties, for example during filling of containers, which are based on their high viscosity at room temperature and below. This difficulty is overcome by diluting the paint raw materials with a solvent.

Low-viscosity isocyanurate polyisocyanate have hitherto been prepared by the abovementioned standard processes with a reduced conversion. However, these processes are uneconomic, since a considerable proportion of unreacted diisocyanates must be distilled off and recycled, i.e. the useful products are only achieved at a low space-time yield. A further disadvantage is that the achievable intrinsic viscosity, which is in the range from 2000 to 4000 mPas at 25° C. in standard systems, can only be reduced by a factor of about 2. Only by additionally using an inert solvent for carrying out the trimerization reaction can, according to DE-A-38 10 908 (U.S. Pat. No. 4,801,663), the viscosity of the isocyanurate polyisocyanates based on HDI be reduced, but removal of the solvent forms an additional, undesired, extra-cost process step.

It is an object of the present invention to provide low-viscosity, isocyanurate and urethane group-containing polyisocyanate mixtures with a long shelf life which can be used, in particular, for formulating reduced-solvent, 2-component PU paints. Since allophanates, as stated above, are re-cleaved during storage to give the starting isocyanates, it is a further object to completely prevent, or at least substantially reduce, their formation during the reaction with alcohols.

We have found that, surprisingly, these objects are achieved by carrying out the modification of the organic diisocyanates in a specific way.

The present invention accordingly provides a process for the preparation of isocyanurate and urethane group-containing polyisocyanate mixtures by partially cyclizing organic diisocyanates in the presence of trimerization catalysts, deactivating the trimerization catalysts when the cyclization is complete, and subsequently reacting the resultant isocyanurate group-containing polyisocyanate mixtures with hydroxyl compounds, which comprises reacting the partially trimerized, isocyanurate group-containing polyisocyanate mixtures with from 0.5 to 10 mol % of at least one hydroxyl compound from the group consisting of aliphatic alcohols, cycloaliphatic alcohols and polyoxyalkylene alcohols, or mixtures of at least two of said alcohols, and then separating off the monomeric diisocyanates.

The novel process gives low-viscosity, isocyanurate and urethane group-containing polyisocyanate mixtures which, surprisingly, contain only small amounts of allophanate groups, or none at all, since the urethanes formed are retained essentially completely. If, by contrast, the organic diisocyanates are first reacted with the hydroxyl compounds (pre-urethanization) or the hydroxyl compounds are used as solvents for the trimerization catalysts employed and the organic diisocyanates are introduced continuously into the cyclization reaction, low-viscosity isocyanurate group-containing polyisocyanate mixtures are certainly likewise obtained, but they have a high content of allophanates, formed from the urethanes present, which can have an adverse affect on the content of free monomeric diisocyanates during extended storage of the end products. If, by contrast, the isocyanurate group-containing polyisocyanates are partially modified by means of hydroxyl compounds after the monomeric diisocyanates have separated off, the urethane formation causes no reduction in viscosity. Although the formation of allophanates by the pre-urethanization process and the formation of urethanes by the process according to the invention allow the possibility of the formation of hydrogen bridges, giving rise to expectations of an increase in viscosity of the polyisocyanate mixture, this did not occur. Instead, both processes give low-viscosity, isocyanurate-containing polyisocyanate mixtures, but, in contrast to the urethane and isocyanurate group-containing polyisocyanate mixtures according to the invention, the former, with a considerable allophanate content are somewhat unsuitable as paint raw materials, due to their limited shelf life.

The following details apply to the preparation of the low-viscosity, isocyanurate and urethane group-containing polyisocyanate mixtures by the process according to the invention, to the starting materials and trimerization catalysts which can be used for this process, and to their deactivating agents:

The organic diisocyanates used are preferably light-stable araliphatic, in particular aliphatic and cycloaliphatic diisocyanates. Specific examples which may be mentioned are araliphatic diisocyanates, e.g. xylylene diisocyanate, tetramethylxylylene diisocyanate and 4,4'-bis(isocyanatomethyl)diphenylmethane, aliphatic diisocyanates, expediently those having 4 to 12 carbon atoms, preferably 6 to 10 carbon atoms, for example butane 1,4-diisocyanate, hexane 1,6-diisocyanate, decane 1,10-diisocyanate, dodecane 1,12-diisocyanate and in particular hexamethylene 1,6-diisocyanate, and cycloaliphatic diisocyanates having 6 to 15 carbon atoms, preferably 6 to 13 carbon atoms, for example cyclohexane 1,3-, or 1,4-diisocyanates, 1,3- or 1,4-bis-(isocyanatomethyl)cyclohexane, dicyclohexylmethane 2,2'-, 2,4'- and 4,4'-diisocyanate, and in particular 1-isocyanato-3,5,5-trimethyl-3-isocyanatomethylcyclohexane (IPDI). The araliphatic, aliphatic and cycloaliphatic diisocyanates can be used individually or in the form of mixtures from the same group or from different groups. It is furthermore possible for aromatic diisocyanates, e.g. diphenylmethane 4,4'-2,4'- and/or 2,2'-diisocyanate and tolylene 2,4- and 2,6-diisocyanate, mixed with the abovementioned diisocyanates or individually, to be converted into the isocyanurate and urethane group-containing polyisocyanate mixtures with the aid of the process according to the invention.

Suitable hydroxyl compounds advantageously have from 1 to 30 carbon atoms, preferably 1 to 9 carbon atoms, and are advantageously selected from the group consisting of linear and branched aliphatic alcohols, cycloaliphatic and alkyl-substituted cycloaliphatic alcohols. It is also possible to use mixtures of these alcohols. Examples which may be mentioned are linear and branched alkanols, e.g. methanol, ethanol, n- and iso-propanol, n-butanol, sec-butanol, n-pentanol, n-hexanol, octanol, nonanol, 2-ethylbutanol, 2,2-dimethylhexanol, 2-ethylhexanol, cyclohexanol, methylcyclohexanol and ethylcyclohexanol. Compounds which have proven highly successful and are therefore preferred are branched alcohols having 3 to 9 carbon atoms, in particular 2-ethylhexanol.

The hydroxyl compounds may furthermore be polyoxyalkylene alcohols having a molecular weight of up to 2000, preferably up to 1000, preferably those from the group consisting of polyoxyethylene alcohols, polyoxypropylene alcohols and polyoxypropylene-polyoxyethylene alcohols. Suitable polyoxyalkylene alcohols of this type, which may contain the oxyalkylene groups bonded blockwise or randomly, can be prepared, for example, in a manner known per se by polyaddition of ethylene oxide, 1,2-propylene oxide or mixtures of ethylene oxide and 1,2-propylene oxide onto a monofunctional initiator molecule, e.g. a linear or branched alkanol having 1 to 20 carbon atoms.

The hydroxyl compounds which are suitable for urethane formation are used in an amount of from 0.5 to 10 mol %, preferably from 1 to 6 mol %, in particular from 2 to 5 mol %, based on the molar amounts of organic diisocyanates employed, it being possible to achieve increasing mutual compatibility of the reaction products with increasing degree of branching for the same molecular weight of the alcohols. Alcohols containing more than 30 carbon atoms or polyoxyalkylene alcohols having molecular weights of greater than 2000 cause an undesirably significant reduction in the NCO content of the polyisocyanate mixture according to the invention.

The partial cyclization of the organic diisocyanates can be carried out using the abovementioned, known and conventional trimerization catalysts. Due to their simple preparation and purification, preferred trimerization catalysts are trialkylhydroxyalkylammonium salts, e.g. N,N,N-trimethyl-N-2-hydroxypropylammonium p-tert-butylbenzoate and in particular N,N,N-trimethyl-N-2-hydroxypropylammonium 2-ethylhexanoate. Trimerization catalysts, which can also cause the formation of uretdione groups and oligomeric isocyanurate groups as byproducts, are usually used in an amount of from 0,001 to 0.5% by weight, preferably from 0.01 to 0.05% by weight, based on the weight of the organic diisocyanates.

After the desired amount of isocyanurate groups has formed, which can be determined analytically by constant determination of the NCO content of the reaction mixture, the trimerization catalysts are usually deactivated. Examples of suitable deactivators are inorganic and organic acids, the corresponding acid-halides and alkylating agents. Specific examples are phosphoric acid, monochloroacetic acid, dodecylbenzene/sulfonic acid, benzoyl chloride, dimethyl sulfate and preferably dibutyl phosphate. The deactivators can be employed in amounts of from 1 to 200 mol %, preferably from 20 to 100 mol %, based on the amount of trimerization catalyst.

Although the isocyanurate and urethane group-containing polyisocyanates can also be prepared in the presence of inert solvents or diluents, these are preferably not used in the process according to the invention for ecological and economic reasons.

For the preparation of the isocyanurate and urethane group-containing polyisocyanate mixtures by the process according to the invention, the organic diisocyanates are partially cyclized at from 30° to 110° C., preferably at from 60° to 100° C., in the presence of the trimerization catalysts, advantageously under an atmosphere of gases which are inert under the reaction conditions, e.g. nitrogen. When the desired isocyanurate content or NCO content, which is advantageously in an NCO range of from 35 to 48% by weight, preferably from 40 to 45% by weight, based on the weight of the isocyanurate group-containing reaction mixture, has been reached, which usually takes from 0.1 to 5 hours, depending on the reaction temperature, the trimerization catalyst is deactivated by adding a deactivator, and the isocyanurate formation is thus ended. At least one hydroxyl compound is then added continuously or in portions, to the resultant isocyanurate group-containing polyisocyanate mixture at from 30° to 100° C. preferably at from 60° to 90° C. and the reaction mixture is reacted to completion at a temperature in the above range, which takes from 0.25 to 6 hours, preferably from 0.5 to 2 hours. The excess monomeric organic diisocyanates are then separated off, expediently with the aid of a thin-film evaporator under reduced pressure.

The essentially diisocyanate-free, isocyanurate and urethane group-containing polyisocyanate mixtures prepared by the process according to the invention, which have NCO contents of from 10 to 23% by weight, preferably from 15 to 22% by weight, an allophanate content less than 1 area percent, measured by gel permeation chromatography (GPC), preferably less than 0.5 area percent, and a residual content of monomeric organic diisocyanates of less than 0.5% by weight, preferably less than 0.2% by weight, the % by weight data in each case being based on the weight of the polyisocyanate mixture, and may contain small amounts of uretdione groups and oligomeric isocyanurate groups, are virtually colorless to pale yellowish, preferably clear liquids which have a very good shelf life and have a viscosity at 25° C. of less than 1500 mPas, preferably from 300 to 1000 mPas.

The low-viscosity, isocyanurate and urethane group-containing polyisocyanate mixtures are easy to handle, in particular are readily flowable, at relatively low temperatures, e.g. from 0° to 25° C., even without dilution withat used a solvent, and are thus readily transferrable into containers and tank cars. The products are particularly suitable for the formulation of high-quality, weathering-resistant, reduced-solvent 2-component PU paints and high-solids PU paints. They can furthermore be used as substitutes for conventional polyisocyanates in conventional polyurethane formulations, e.g. in systems for adhesives or coatings and for the preparation of PU dispersions.

EXAMPLES 1 to 10

Preparation of isocyanurate and urethane group-containing polyisocyanate mixtures General preparation procedure 500 g (2.97 mol) of hexamethylene 1,6-diisocyanate (HDI) were warmed to 80° C. under a nitrogen atmosphere with stirring, 400 ppm of N,N,N-trimethyl-N-(2-hydroxypropyl)ammonium 2-ethylhexanoate as trimerization catalyst were added, and the reaction mixture was cyclized at this temperature to an NCO content of from 42 to 45% by weight, corresponding to an HDI conversion of approximately 20–35% by weight. The trimerization catalyst was deactivated by adding 1 cm³ of a 10% strength by weight solution of dibutyl phosphate in HDI, the hydroxyl compound was then introduced into the isocyanurate group-containing polyisocyanate mixture, and the urethane formation was carried out at 80° C. for a period of 2 hours with stirring. In order to separate off the monomeric HDI to a residual content of less than 0.2% by weight, the reaction mixture was distilled under reduced pressure in a thin-film evaporator.

Virtually colorless to pale yellowish, clear, liquid, isocyanurate and urethane group-containing polyisocyanate mixtures having an allophanate content of less than 1 area percent, measured by gel permeation chromatography (GPC) by evaluation of the area under the peaks, were obtained.

The hydroxyl compounds and amounts used for urethane formation, the NCO content of the isocyanurate group-containing polyisocyanate mixture and of the isocyanurate and urethane group-containing, essentially HDI-free polyisocyanate mixture, and its viscosity, measured at 25° C., are shown in Table I.

evaporator in order to separate off the monomeric HDI to a residual content of less than 0.2% by weight.

Virtually colorless to pale yellowish, preferably clear, urethane and isocyanurate group-containing polyisocyanate mixtures having an allophanate content of from 1 to 15 area percent (GPC) were obtained.

The hydroxyl compounds and amounts used for urethane formation, the NCO content of the urethane and isocyanurate group-containing polyisocyanate mixtures, the NCO content of the end product obtained after removal of the monomeric HDI and its viscosity are shown in Table II.

The allophanate and urethane group contents were determined, as stated above, by gel permeation chroma-

TABLE I

Isocyanurate and urethane group-containing polyisocyanate mixtures - Examples

| Ex. | Hydroxyl compound Type | Amount [mol %] | NCO content of the isocyanurate and urethane group-containing polyisocyanate mixture [% by weight] | NCO content of the HDI-free isocyanurate and urethan group-containing polyisocyanate mixture [% by weight] | Viscosity [mPa · s at 25° C. |
|---|---|---|---|---|---|
| 1 | n-butanol | 3 | 41.1 | 22.0 | 1240 |
| 2 | n-butanol | 5 | 40.9 | 21.6 | 830 |
| 3 | 2-ethylhexanol | 3.3 | 41.2 | 20.7 | 1080 |
| 4 | 2-ethylhexanol | 5 | 41.4 | 20.2 | 500 |
| 5 | 2-ethylhexanol | 5 | 42.7 | 19.3 | 460 |
| 6 | Methoxyethylene alcohol having a molceular weight of 520 | 2 | 40.9 | 18.2 | 670 |
| 7 | Methoxyethylene alcohol having a molecular weight of 520 | 2.5 | 40.8 | 17.1 | 550 |
| 8 | Methoxyethylene alcohol having a molecular weight of 520 | 3 | 41.1 | 15.9 | 420 |
| 9 | n-octanol | 3 | 40.7 | 20.9 | 980 |
| 10 | n-octanol | 4 | 41.3 (cloudy) | 20.4 | 700 (cloudy) |

COMPARATIVE EXAMPLES I to XIV

Preparation of the urethane and isocyanurate group-containing polyisocyanate mixtures General preparation procedure:

500 g (2.97 mol) of HDI were warmed to 80° C. under a nitrogen atmosphere with stirring, 400 ppm of N,N,N-trimethyl-N-(2-hydroxypropyl)ammonium 2-ethylhexanoate, dissolved in the hydroxyl compound whose type and amount is given in Table II, were added, and the reaction mixture was urethanized and simultaneously cyclized at this temperature to an NCO content of 40 to 42% by weight, corresponding to an HDI conversion of approximately 30% by weight.

The reaction time to achieve this was approximately 0.5–4 hours. The trimerization catalyst was deactivated by adding 1 cm³ of a 10% strength by weight solution of dibutyl phosphate in HDI, and the polyisocyanate mixture was distilled under reduced pressure in a thin-film tography. The gel permeation chromatogram (figure) shows the various urethane and allophanate contents determined for Example 2 and Comparative Example I using n-butanol as the hydroxyl compound. The polyisocyanate mixture prepared as described in Example 2 has an obvious urethane peak and virtually no allophanate peak, while the product from Comparative Example I has an obvious allophanate peak and virtually no urethane peak.

COMPARATIVE EXAMPLE XV

Preparation of isocyanurate group-contaiinding polyisocyanate mixture

The procedure was similar to that of Examples I to XIV, but the cyclization reaction was carried out in the absence of a hydroxyl compound. The NCO content of the HDI-containing and HDI-free, isocyanurate group-containing polyisocyanate mixture and its viscosity are given in Table II.

TABLE II

Isocyanurate and urethane group-containing polyisocyanate mixtures - Comparative Examples

| Comp. Ex. | Hydroxyl compound Type | Amount [mol %] | NCO content of the urethane and isocyanurate group-containing polyisocyanate mixture [% by weight] | NCO content of the essentially HDI-free isocyanurate and urethan group-containing polyisocyanate mixture [% by weight] | Viscosity [mPa · s at 25° C.] |
|---|---|---|---|---|---|
| I | n-butanol | 0.5 | 41.4 | 22.3 | 1600 |
| II | n-butanol | 1.0 | 40.9 | 22.1 | 1550 |
| III | n-butanol | 2.0 | 41.6 | 22.2 | 1000 |
| IV | n-butanol | 4.0 | 41.1 | 21.6 | 600 |
| V | Methanol | 0.5 | 40.9 | 22.4 | 1700 |
| VI | Methanol | 1.0 | 41.0 | 22.4 | 1600 |

TABLE II-continued

Isocyanurate and urethane group-containing polyisocyanate mixtures - Comparative Examples

| Comp. Ex. | Hydroxyl compound Type | Amount [mol %] | NCO content of the urethane and isocyanurate group-containing polyisocyanate mixture [% by weight] | NCO content of the essentially HDI-free isocyanurate and urethan group-containing polyisocyanate mixture [% by weight] | Viscosity [mPa · s at 25° C.] |
|---|---|---|---|---|---|
| VII | Methanol | 2.0 | 41.0 | 22.2 | 1300 |
| VIII | Methanol | 4.0 | 41.5 | 22.3 | 800 |
| XI | Cyclohexanol | 2.0 | 41.7 | 22.2 | 1200 |
| X | 2-ethylhexanol | 0.54 | 41.3 | 22.4 | 1500 |
| XI | 2-ethylhexanol | 1.08 | 40.9 | 22.0 | 1300 |
| XII | 2-ethylhexanol | 4.40 | 40.8 | 20.4 | 500 |
| XIII | 2-ethylhexanol | 5.0 | 41.6 | 20.1 | 450 |
| XIV | 2-ethylhexanol | 5.48 | 41.1 | 20.3 | 400 |
| XV | — | — | urethane group-free 40.9 | urethane group-free 22.3 | 2300 |

COMPARATIVE EXAMPLES XVI to XXVIII

Preparation of the urethane and isocyanurate group-containing polyisocyanate mixtures General preparation procedure 500 g (2.97 mol) of HDI were urethanized and simultaneously cyclized by a method similar to that of Comparative Examples I to XIV in the presence of amount A of the hydroxyl compound. When the desired NCO content of from 40 to 42% by weight, corresponding to an HDI conversion of approximately 30% by weight, had been reached, the trimerization catalyst was deactivated by adding 1 cm$^3$ of a 10 % strength by weight solution of dibutyl phosphate in HDI, amount B of the hydroxyl compound was added to the reaction mixture, and the urethane formation was completed at 80° C. in one hour. In order to remove the monomeric HDI to a residual content of less than 0.2% by weight, the polyisocyanate mixture was distilled under reduced pressure in a thin-film evaporator.

Virtually colorless to pale yellowish, clear, urethane and isocyanurate group-containing polyisocyanate mixtures having an allophanate content of from 1 to 3 area percent (GPC) were obtained.

The hydroxyl compounds used for urethane formation and their amounts A and B, the NCO content of the urethane and isocyanurate group-containing polyisocyanate mixture after addition of amounts A and B of the hydroxyl compound, the NCO content of the essentially HDI-free end product and its viscosity are shown in Table III.

of trimerization catalysts, deactivating the trimerization catalysts when the cyclization is complete, and subsequently reacting the resultant isocyanurate group-containing polyisocyanate mixtures with hydroxyl compounds, which comprises reacting the partially trimerized isocyanurate group-containing polyisocyanate mixtures with from 0.5 to 10 mol % of at least one hydroxyl compound selected from the group consisting of aliphatic alcohols, cycloaliphatic alcohols polyoxyalkylene alcohols and mixtures thereof, and then separating off the monomeric diisocyanates.

2. A process as claimed in claim 1, wherein the organic diisocyanates are selected from the group consisting of aliphatic, cycloaliphatic and araliphatic diisocyanates.

3. A process as claimed in claim 1, wherein the organic diisocyanate is 1,6-hexamethylene diisocyanate.

4. A process as claimed in claim 1, wherein the aliphatic or cycloaliphatic alcohols have 1 to 9 carbon atoms.

5. A process as claimed in claim 1, wherein the aliphatic alcohols are branched and have 3 to 9 carbon atoms.

6. A process as claimed in claim 1, wherein the aliphatic alcohol is 2-ethylhexanol.

7. A process as claimed in claim 1, wherein the polyoxyalkylene alcohols have a molecular weight of up to 2000 and are selected from the group consisting of polyoxyethylene alcohols, polyoxypropylene alcohols and polyoxypropylene-polyoxyethylene alcohols.

8. A process as claimed in claim 1, wherein the trim-

TABLE III

Isocyanurate and urethane group-containing polyisocyanate mixtures - Comparative Examples

| Comp. Ex. | Hydroxyl compound Type | Amount A [mol %] | Amount B [mol %] | NCO content of the urethane and iscyanurate group-containing polyisocyanate mixture after addition of the hydroxyl compound [% by weight] | NCO content of the essentially HDI-free isocyanurate and urethan group-containing polyisocyanate mixture (end product) [% by weight] | Viscosity [mPa · s at 25° C.] |
|---|---|---|---|---|---|---|
| XVI | 2-ethylhexanol | 1.1 | 2.2 | 40.7 | 21.1 | 800 |
| XVII | 2-ethylhexanol | 1 | 4 | 41.4 | 20.1 | 610 |
| XVIII | Methylethylene alcohol having a molecular weight of 520 | 1 | 2 | 41.6 | 15.7 | 300 |

We claim:

1. A process for the preparation of isocyanurate and urethane group-containing polyisocyanate mixtures by partially cyclizing organic diisocyanates in the presence erization catalyst used is 2-hydroxypropyltrimethylammonium 2-ethylhexanoate.

9. A process as claimed in claim 1, wherein the partially trimerized isocyanurate group-containing polyisocyanate mixtures have an NCO content of from 35 to 48% by weight.

10. A process as claimed in claim 1, wherein the essentially diisocyanate-free, isocyanurate and urethane group-containing polyisocyanate mixtures have an NCO content of from 10 to 23% by weight.

11. A process as claimed in claim 1, wherein said hydroxyl compound is selected from the group consisting of methanol, ethanol, n-propanol, isopropanol, n-butanol, n-pentanol, n-hexanol, octanol, nonanol, 2-ethylbutanol, 2,2-dimethylhexanol, 2-ethylhexanol, cyclohexanol, methylcylohexanol, ethylcylohexanol, polyoxyalkylene alcohols having a molecular weight of up to 2000, and mixtures thereof.

12. The process of claim 11, wherein the alcohol comprises 2-ethylhexanol.

13. An isocyanurate and urethane group-containing polyisocyanate mixture having an NCO content of from 10 to 23 percent by weight, as allophanate content of less than 1.0 area percent measured by gel permeation chromatography, and a residual content of monomeric organic diisocyanates of less than 0.5 percent by weight, each of the percent by weights being based on the weight of the polyisocyanate mixture, said polyisocyanate mixture having a viscosity at 25° C. of less than 1500 mPas.

14. The polyisocyanate mixture of claim 13, wherein the viscosity ranges from 300 to 1000 mPas.

15. The polyisocyanate mixture of claim 14, wherein the allophonate content is less than 0.5 area percent.

16. The polyisocyanate mixture of claim 13, having a NCO content of 15 to 22 percent by weight.

17. The polyisocyanate mixture of claim 13, having a residual content of monomeric organic diisocyanates of less than 0.2 percent by weight.

18. A two component polyurethane print comprising the polyisocyanate mixture of claim 13.

19. A high solids polyurethane print comprising the polyisocyanate mixture of claim 13.

20. A polyurethane dispersion comprising the polyisocyanate mixture of claim 13.

* * * * *